3,360,374
PROCESS FOR MAKING A DIETARY FOOD PRODUCT
Courtland H. Barr, Sr., Los Angeles, Courtland H. Barr, Jr., La Canada, and John W. Barr, Glendale, Calif., assignors to Courtland Laboratories, Los Angeles, Calif., a corporation of California
No Drawing. Filed July 27, 1965, Ser. No. 475,235
9 Claims. (Cl. 99—1)

This application is a continuation-in-part of Serial No. 203,694, filed June 20, 1962, now abandoned, the disclosure of which is expressly incorporated herein by reference.

This invention relates to dietary food products and the process of making them. More particularly the present invention relates to dietary products comprising a mixture of a foodstuff and methylcellulose, said foodstuff being substantially free from amino acid, to which is added an amino acid.

It is common knowledge that many attempts have been made to provide low-calorie dietary foods which are reasonably pleasant to eat. However, many of these attempts have been met with a notable lack of success. Specifically, many of the dietary foods of the dehydrated type are characterized by a tendency to stick to the mouth, particularly to the roof of the mouth while eating. This condition represents an undesirable inconvenience to those persons who are obliged to conscientiously follow a diet program based on such dietary foods in order to control the intake of calories, cholesterol or the like. Therefore there has been a long standing need for a dietary food which in addition to controlling food intake, also provides the satisfaction of eating (both psychological and physiological). The present invention provides such a dietary food.

It is accordingly a principal object of our invention to provide a dietary food which will serve to control calorie or cholesterol intake and also to provide a dietary food which is free of the tendency to stick to the mouth or to otherwise create undesirable sensations upon consumption.

It is another object of this invention to provide a process of preparing a dietary food by a freeze drying process and the product thereof.

It is a further object of the invention to provide a dietary food which also furnishes the satisfactions of fullness and taste.

It is yet another object of the present invention to provide a process for producing a dietary food comprising a foodstuff and methylcellulose, adding an amino acid thereto, and freeze drying said mixture.

Other objects and advantages of the present invention will be readily apparent from the following detailed description of the preferred embodiments thereof.

Briefly, the present invention comprises a mixture of methylcellulose and a foodstuff which is substantially free from amino acid, said product containing amino acid in an amount sufficient to substantially prevent the product from sticking to the mouth, said product being freeze dried. The invention further envisions the process for preparing such a dietary food product. The foodstuff employed in the present invention may be cooked before it is freeze dried or may be cooked after freeze drying and before eating in those cases where cooking is necessary or desirable. The present invention also contemplates the separation of juices from the foodstuff by a squeezing process before freeze drying. These juices may then be used as all or part of a reconstituting liquid before the dietary food is consumed. Another feature of the present invention is the addition of a wetting agent to the reconstituting liquid to enhance the reconstitution. Yet another feature of the invention is the use of the dietary food to control liquid and/or cholesterol intake.

The following examples are illustrative of the product and process of this invention, but it is to be understood that the invention is not to be limited to the specific details thereof.

*Example*

A mixture of 33⅓% by volume of cooked mashed carrots, 33⅓% by volume of methylcellulose and 33⅓% by volume of glycine was prepared. The mixture was then formed into a disk approximately 4 inches in diameter. The disk was first frozen and then freeze dried by subjecting it to a vacuum of about 100 microns (McLeod Gauge). The vacuum was developed by means of a mechanical pump. Radiated heat at a temperature of about 100° F. was applied to the disk to cause the frozen liquids contained therein to sublime. This product was then removed from the vacuum. It was found that the product, if hermetically sealed, can be stored indefinitely without regard to the ambient temperature. Before eating, the disk can be soaked in water whereby the methylcellulose is caused to absorb water. This imparts weight to the disk and enhances the transfer of flavor to the methylcellulose. Alternatively, the product can be eaten in dried form in the same manner as a cracker. The product takes on water in the stomach and swelling occurs as a result of the absorption of water, discouraging hunger. The glycine present in the dietary food product was found to prevent sticking to the roof of the mouth.

The product and process of the present invention are not intended to be restricted to the example which is merely illustrative. Any type of foodstuff which is substantially free of amino acid may be profitably formed into a dietary material in accordance with our invention. Thus, any type of vegetable or fruit may be processed in the manner described in the example. The vegetables and fruits employed may be raw or cooked when freeze dried. The foodstuffs may be squeezed to remove excess juices before freeze drying. This removal of juices has the advantage of limiting calorie intake. Furthermore, the juices can then be dried by a spray-drying technique or other economical drying procedure, thereby substantially reducing the cost of the freeze drying operation. If desired, the dried juices may be added to the reconstituting liquid. This permits a certain amount of positive control of the calorie intake per unit of dietary food, as well as providing the product with additional taste-pleasing substance. When a reconstituting liquid is used, it has been found that reconstitution is improved by addition of a wetting agent to the reconstituting liquid. Any non-toxic wetting agent may be used.

The present invention provides a convenient method for the control of the water content present in the diet. The dietary food produced in this invention normally contains on the order of 1% or less by weight of water. Accordingly, the desired control of water intake may be simply accomplished by using the prescribed measured amount of water to reconstitute the dietary product or by taking the prescribed amount of water in conjunction with the dietary product when it is consumed in the dried state. Similarly, the present invention allows control of the sodium chloride intake. The salt content of the dietary product can be adjusted to any desired level by leaching out of any excess salt, or by the addition of salt as required to achieve the desired level. Alternatively, the salt intake can be adjusted by the use of salt water of known concentration to reconstitute the dietary product.

The dietary product is of further benefit in controlling the cholesterol content of the diet. This may be accomplished by adjusting the fat content of the dietary product to any desired predetermined level. In commercial production of our invention, the dietary product is often made up in large quantities on the order of 1000 pounds or more. In processing this amount of material it is relatively simple to perform a fat content analysis which enables the seller of the dietary product to indicate the exact fat content of the product on the package. Thus, the person on a low cholesterol diet may accurately control the fat intake by the consumption of indicated amounts of the dietary product.

The amount of methylcellulose used in the product of the present invention may be varied within any limit depending upon the amount of calorie intake desired. It has been found that the use of methylcellulose greatly facilitates the freeze drying procedure. Although the precise reason for this advantage is not known with certainty, it would seem that the methylcellulose functions both to absorb some of the juices in the undried foodstuff thereby allowing greater distribution of the moisture, and acts as a "spacer" which operates to increase the surface thereby allowing sublimation to occur at a more rapid rate.

As has been indicated, we have found that the use of free amino acids in the dietary product of this invention substantially eliminates the problem of the product sticking to the mouth, particularly to the roof of the mouth. The particular amino acid employed for this purpose is not critical. Typical of the amino acids which may be incorporated in the dietary food product to prevent sticking to the roof of the mouth include glycine, alanine, valine, leucine, isoleucine, aspartic acid, glutamic acid, serine, proline, hydroxy proline, cystine, methionine, phenylalanine, tyrosine, tryptophan, arginine, lysine, histidine, or any other of the consumable amino acids. The amino acid may be added in dried form to the other ingredients after they have been freeze dried. The amino acid may also be added before freeze drying in either dried or solution form.

Any type of freeze drying production may be used in the practice of the present invention. For example, a pump and condenser system, pumps without condensers or steam jet aspiration may be used. It is preferred to use a pump-condenser system because pumps without condensers require the use of extremely large pumps and the use of steam jets introduces the hazard of backfiring. When a condenser system is used, the condenser surfaces should have extremely cold surfaces and a large area. The temperature of the condenser surfaces should be minus 40 degrees C. or lower at 100 microns McLeod Gauge pressure. This temperature functions satisfactorily to condense the sublimed gases to the frozen state without the condensation of liquid. In essence, any temperature which is sufficiently low to condense the sublimed gases to the frozen state without the condensation of liquid is operable. These temperatures will, of course, vary in accordance with the composition of the gases and the pressure. The radiated heat used to sublime the gases from the frozen dietary food mixture preferably has a temperature of about 110 degrees F., but it has been found that a temperature as high as about 375 degrees F. inside shelves where the food-filler mixture is suspended or elevated slightly over the shelves, is operable. The amount of heat which is applied is a function of the condenser capacity to condense the sublimed gases to the frozen state. It has been found preferable to commence the freeze drying procedure with the material which is to be freeze dried at a temperature of about minus 40 degrees C. The temperature of this material will rise during the freeze drying procedure and care must be taken to prevent the frozen liquids in the material from melting, i.e., the temperature of the material must, in most cases, be maintained below zero degrees C.

The temperature at which the foodstuff-methylcellulose mixture will sublime properly will vary somewhat with the composition thereof and the pressures employed. In general, it has been found that the pressure should not exceed about 250 microns McLeod Gauge.

The present invention thus provides a dietary food product which, unlike existing products which are primarily liquids or powders, provides the psychological effect of obtaining satisfaction from mastication and taste. When the unreconstituted, i.e., dry, product is used it absorbs moisture from the mouth and creates a thirst. This thirst induces the person eating the dietary product to drink liquids and thus increase the sense of fullness. It is also preferable to drink something to wet down the tract before beginning to eat the dry product.

Obviously, an entire full-course meal comprising various types of the dietary food products of the present invention is made possible. This is in marked contrast to the conventional dietary food products which are generally flavorless or, in the alternative, flavored with artificial sugary flavorings such as chocolate or butterscotch. There can be no doubt that the variety of taste sensations made possible by the present invention far exceeds anything known to the prior art.

Having fully described our invention, it is to be understood that we do not wish to be limited to the details set forth, but our invention is of the full scope of the appended claims.

We claim:

1. A process for producing a dietary food product comprising preparing a mixture of a foodstuff and methycellulose, said foodstuff being substantially free from amino acid, adding an amino acid to said mixture and freeze drying said mixture, said amino acid being added in sufficient amount to substantially prevent said mixture from sticking to the mouth.

2. The process of claim 1 wherein said foodstuff is cooked prior to freeze drying.

3. The process of claim 1 wherein said foodstuff is cooked after freeze drying.

4. The process of claim 1 wherein said mixture comprises about 50% by volume of said foodstuff and about 50% by volume of said methylcellulose.

5. The process of claim 1 wherein a substantial portion of the juices are removed from said foodstuff before freeze drying.

6. A process for producing a dietary food product comprising preparing a mixture of a foodstuff and methylcellulose, said foodstuff being substantially free from amino acid, removing the juices from said foodstuff, adding an amino acid to said mixture and freeze drying said mixture, said amino acid being added in sufficient amount to substantially prevent said mixture from sticking to the mouth.

7. The process of claim 6 wherein liquid is added to said mixture after freeze drying whereby said mixture is reconstituted.

8. The process of claim 6 wherein liquid is added to said mixture after freeze drying in a measured amount whereby said mixture is reconstituted and the liquid content of the diet is controlled.

9. A process for producing a dietary food product comprising preparing a mixture of a foodstuff and methylcellulose, said foodstuff being substantially free from amino acid, adding an amino acid to said mixture and freeze drying said mixture, said amino acid being added in sufficient amount to substantially prevent said mixture from sticking to the mouth, and the fat content of said product being maintained at a predetermined level to provide control of the cholesterol intake.

References Cited
UNITED STATES PATENTS

| | | | |
|---|---|---|---|
| 2,302,511 | 11/1942 | Wallach | 99—1 |
| 2,496,278 | 2/1950 | Eddy | 99—206 |
| 3,023,104 | 2/1962 | Battista | 99—1 |
| 3,083,108 | 3/1963 | Kline et al. | 99—208 |

LIONEL M. SHAPIRO, *Primary Examiner.*